United States Patent
Chan (10) Patent No.: US 9,726,389 B2
(45) Date of Patent: Aug. 8, 2017

(54) PERSONAL EVAPORATIVE COOLING APPARATUS

(71) Applicant: Ledatron Company Limited, Kowloon, Hong Kong (CN)

(72) Inventor: Ka Yun Chan, Hong Kong (CN)

(73) Assignee: LEDATRON COMPANY LIMITED, Kowloon, Hong Kong (CN)

( * ) Notice: Subject to any disclaimer, the term of this patent is extended or adjusted under 35 U.S.C. 154(b) by 235 days.

(21) Appl. No.: 14/808,424

(22) Filed: Jul. 24, 2015

(65) Prior Publication Data
US 2017/0023268 A1    Jan. 26, 2017

(51) Int. Cl.
| F24F 5/00  | (2006.01) |
| F24F 6/14  | (2006.01) |
| F24F 13/14 | (2006.01) |
| F24F 13/20 | (2006.01) |
| F24F 13/26 | (2006.01) |

(52) U.S. Cl.
CPC .............. *F24F 5/0035* (2013.01); *F24F 6/14* (2013.01); *F24F 13/14* (2013.01); *F24F 13/20* (2013.01); *F24F 13/26* (2013.01); *F24F 2006/146* (2013.01); *F24F 2013/1433* (2013.01); *F24F 2221/12* (2013.01)

(58) Field of Classification Search
CPC .. F24F 5/0035; F24F 6/14; F24F 13/14; F24F 13/26; F24F 2221/12; F24F 2006/146; F24F 2013/1433
See application file for complete search history.

(56) References Cited

U.S. PATENT DOCUMENTS

| 4,284,128 A   | 8/1981 | Nelson |
| 4,953,831 A * | 9/1990 | Albrecht ............. B60H 1/3202 261/102 |
| 5,497,633 A * | 3/1996 | Jones .................... B05B 7/0075 62/259.4 |
| 5,715,698 A * | 2/1998 | Calton ................... F24F 6/043 62/309 |
| 6,101,831 A * | 8/2000 | Ciccone ................ F24F 5/0035 62/310 |

(Continued)

FOREIGN PATENT DOCUMENTS

| CN | 201740149 U | 2/2011 |
| CN | 102226560 A | 10/2011 |

*Primary Examiner* — Emmanuel Duke
(74) *Attorney, Agent, or Firm* — Leydig, Voit & Mayer, Ltd.

(57) ABSTRACT

A portable evaporative cooling apparatus includes a primary passage for delivering a primary air stream to an induction nozzle. A secondary passage that is substantially unobstructed extends from an ambient air inlet to the induction nozzle. A secondary air stream is induced through the secondary passage by the primary air stream and the primary and secondary air streams are ejected from the induction nozzle into the ambient air. An atomizer in the secondary passage, proximate the ambient air inlet, emits a fine spray of water into the secondary air stream. The mixing of the water spray and induced air flow is performed inside the induction nozzle, which also provides a physical and thermal barrier, and makes a completely cooled air stream available immediately outside the user, so the apparatuses may be placed close to the user's face, for example.

27 Claims, 5 Drawing Sheets

(56) References Cited

U.S. PATENT DOCUMENTS

| | | | | |
|---|---|---|---|---|
| 6,341,499 B1* | 1/2002 | Polychronopoylos | F24F 5/0035 |
| | | | 62/304 |
| 6,371,388 B2* | 4/2002 | Utter | B05B 7/0075 |
| | | | 239/152 |
| 6,422,030 B1* | 7/2002 | Calvert | F24F 5/0035 |
| | | | 62/310 |
| 2002/0078704 A1 | 6/2002 | Stich | |
| 2002/0170309 A1* | 11/2002 | Strauss | A61F 7/00 |
| | | | 62/314 |
| 2006/0131449 A1* | 6/2006 | Azukizawa | B05B 5/0255 |
| | | | 239/690.1 |
| 2008/0053116 A1* | 3/2008 | Reyzin | F24F 5/0035 |
| | | | 62/121 |
| 2009/0000325 A1* | 1/2009 | Johnson | F24F 6/043 |
| | | | 62/259.4 |
| 2013/0175362 A1* | 7/2013 | Lee | F24F 6/14 |
| | | | 239/302 |

\* cited by examiner

PERSONAL EVAPORATIVE COOLING APPARATUS

TECHNICAL FIELD

The present invention relates generally to personal cooling apparatuses employing the evaporative cooling principle.

BACKGROUND OF THE INVENTION

It is known in the art to provide a self-contained evaporative personal cooling apparatus that can be hand-held or, for instance, hung about a user's waist or neck. Such apparatuses comprise a water mister and a blower and often provide a two-stage cooling effect. In the first stage, flash evaporation of a finely divided water mist cools that air before it is blown over the skin, while in the second the air flow that carries moisture to the skin also increases the rate of evaporation of this moisture from the skin, for a wind chill effect.

U.S. Pat. No. 6,371,388 describes a misting blower, secured about the waist of the user, in which a fine spray of water is provided adjacent to the blower's exhaust nozzle, such that the air and water spray mixing and cooling primarily takes place outside the nozzle outlet. However, where the outlet of such apparatuses may be placed closer to the user's face, for example, it would be advantageous that doing so would not compromise the cooling performance or create discomfort for the user.

Moreover, in compact self-contained devices such as these, the fan is typically mounted directly on the output shaft of an electric motor, or gear motor, resulting in heat lost by the motor causing sensible heating of the air stream, before the air stream is subsequently humidified and cooled.

It is an object of the present invention to overcome or substantially ameliorate the above disadvantages or, more generally, to provide an improved personal evaporative cooling apparatus.

DISCLOSURE OF THE INVENTION

According to one aspect of the present invention there is provided a portable evaporative cooling apparatus comprising:

an induction nozzle;

a primary passage for delivering a primary air stream to the induction nozzle;

an secondary passage that is substantially unobstructed and extends from an ambient air inlet to the induction nozzle, whereby a secondary air stream is induced through the secondary passage by the primary air stream and the primary and secondary air streams are ejected from the induction nozzle into the ambient air; and an atomiser in the secondary passage proximate the ambient air inlet for emitting a fine spray of water into the secondary air stream.

Preferably the primary and secondary passages are bounded by substantially impermeable walls of a first housing. The walls may be rigid and formed of polymeric material, as by moulding.

Preferably at least a first portion of the primary passage extends from the induction nozzle lengthwise adjacent to the secondary passage, and is separated from the secondary passage by a shared wall separating the primary and secondary passages.

Preferably the first portion converges toward the induction nozzle. Preferably a second portion of the primary passage joins the first portion, the first portion is curved and the second portion is linear and extends adjacent to the tank.

Preferably the induction nozzle and the atomiser are disposed at longitudinally opposing ends of the secondary passage, and the inlet is disposed generally transversely of a centreline of the secondary passage between the induction nozzle and the atomiser.

Preferably the secondary passage is curved in its longitudinal direction, and the portion of the secondary passage adjacent the induction nozzle has a generally constant cross section throughout its length.

The secondary passage may be bounded in part by the shared wall and in part by an external wall, the outer surface of which is exposed to ambient air. Alternatively, the secondary passage is bounded completely by the shared wall, the shared wall being tubular and disposed within an external wall, such that the primary passage surrounds the shared wall.

Preferably the apparatus further comprises a water tank demountable from the apparatus, wherein the atomiser is mounted at a lower end of the tank, and a vented lid disposed in an upper end of the tank. The tank may be received in a recess in the housing disposed adjacent the second portion of the primary passage. The tank may be substantially surrounded by an insulator for reducing heat transfer through the walls of the tank. For instance, the tank may comprise a vacuum flask for holding chilled water.

Preferably the atomiser is an ultrasonic atomiser. Alternatively, other types of atomiser, such as pump-actuated spray atomisers may be employed.

A motor-driven oscillatory vane may be mounted to the first housing for projecting into the outlet stream from the nozzle so as to sweep the outlet stream back and forth.

A second housing assembly may be demountably coupled to the first housing assembly, the second housing assembly comprising a fan for impelling the primary air stream and means for supplying power to the ultrasonic atomiser.

This invention provides a personal evaporative cooling apparatus which is effective and efficient in operational use. The apparatus may be economically constructed due to an overall simple form which minimizes manufacturing costs and by offering an essentially modular design. The lengthwise mixing zone of the present invention has distinct advantages over the prior art, in which the air and water spray mixing and cooling takes place outside the nozzle outlet, well beyond the protected environment of the nozzle itself. The principal advantages of internal mixing, as opposed to external mixing, are (1) physical isolation of the mixing zone from disruption by ambient winds (2) a degree of thermal isolation of the mixing zone from the ambient air and, (3) more uniform mixing of the ambient air and water spray across the secondary passage. As the flash evaporation starts near the inlet to the secondary passage and is largely complete by the time it reaches the induction nozzle, the cooling effect at short range from the nozzle allows it to be placed closer to the user's face, for example, without depositing excessive moisture on the skin. Furthermore, the substantially unobstructed secondary passage contains no motor, or other heat source, that can compromise the cooling performance.

BRIEF DESCRIPTION OF THE DRAWINGS

Preferred forms of the present invention will now be described by way of example with reference to the accompanying drawings, wherein:

DESCRIPTION OF THE PREFERRED EMBODIMENTS

Figure 1:
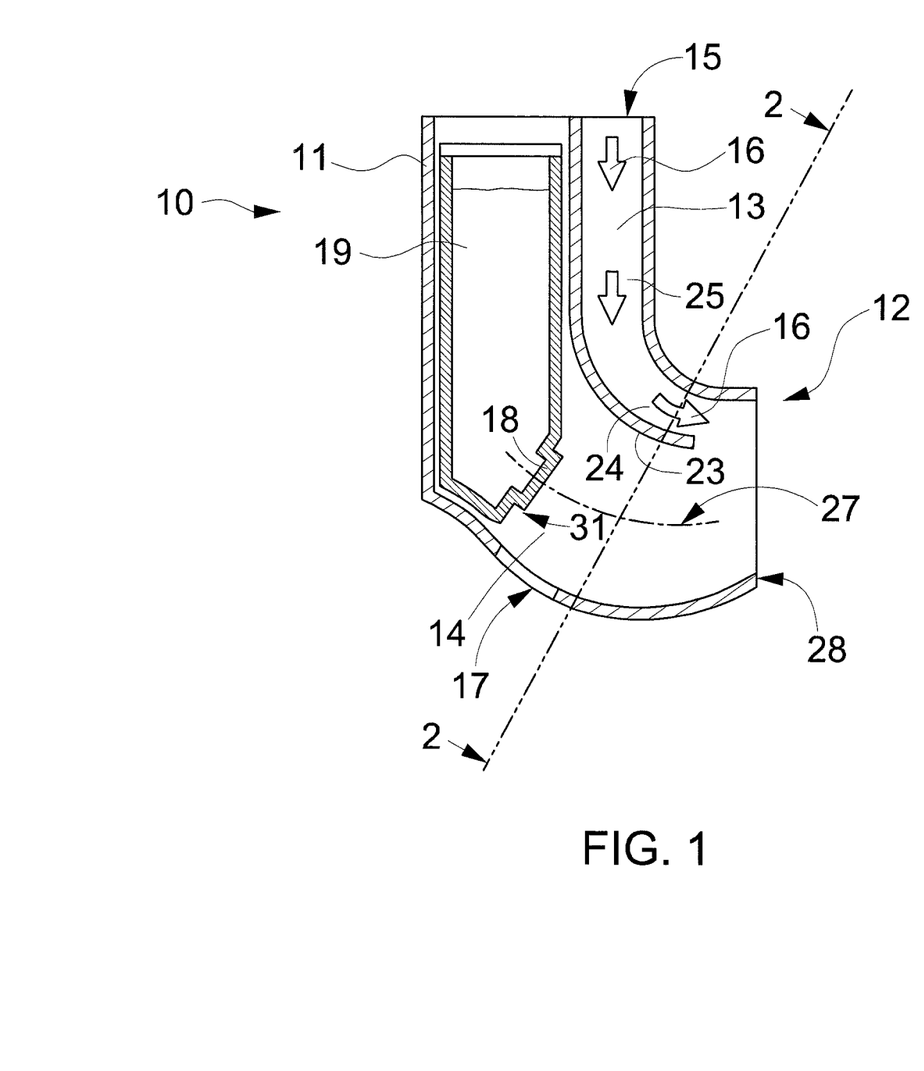
FIG. 1 is a schematic sectional view of a first embodiment of a cooling apparatus of the invention.
Figure 2:
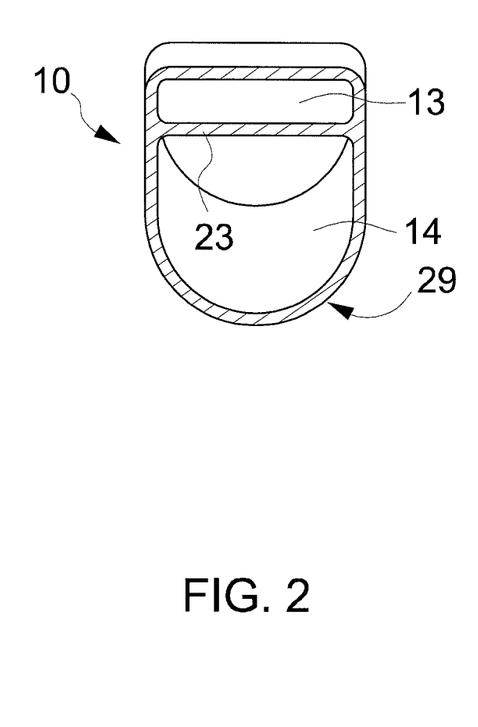
FIG. 2 is a schematic section along plane 2-2 in FIG. 1.

Referring to FIGS. 1 and 2, a first embodiment of an evaporative cooler may be a hand-held cooling apparatus that, when upright (as shown) outputs a generally horizontal outlet stream of cool air and entrained water droplets for personal cooling. The apparatus comprises a first housing 10 having an upper portion 11 ergonomically designed to be conveniently cupped in the palm of a hand, allowing the user to then move the entire apparatus so as to direct the stream from the induction nozzle 12 back toward the user to a point of use.

The housing 10 may be an assembly of rigid substantially impermeable walls of polymeric material, formed as by moulding, so as to define a primary passage 13 and an adjacent secondary passage 14. The primary passage 13 extends from a supply port 15 to the induction nozzle 12 for delivering a primary air stream 16 to the induction nozzle 12. The secondary passage 14 extends from an ambient air inlet 17 to the induction nozzle 12.

An atomiser 18 is disposed in the secondary passage 14 proximate the ambient air inlet 17 near the bottom of a water tank 19. The atomiser may be an ultrasonic atomiser for emitting a fine spray of water into the secondary air stream. The primary air stream 16 induces a relatively smaller secondary air stream through the secondary passage 14. Near the inlet 17 the induced secondary air flow is mixed with the fine spray of water droplets, and the flash evaporation and associated cooling of the secondary air stream that starts near the inlet 17 is largely complete by the time the air reaches the induction nozzle 12. The primary air stream and the secondary air stream are ejected together via the induction nozzle 12 into the ambient air and directed to the point of use.

Figure 3:
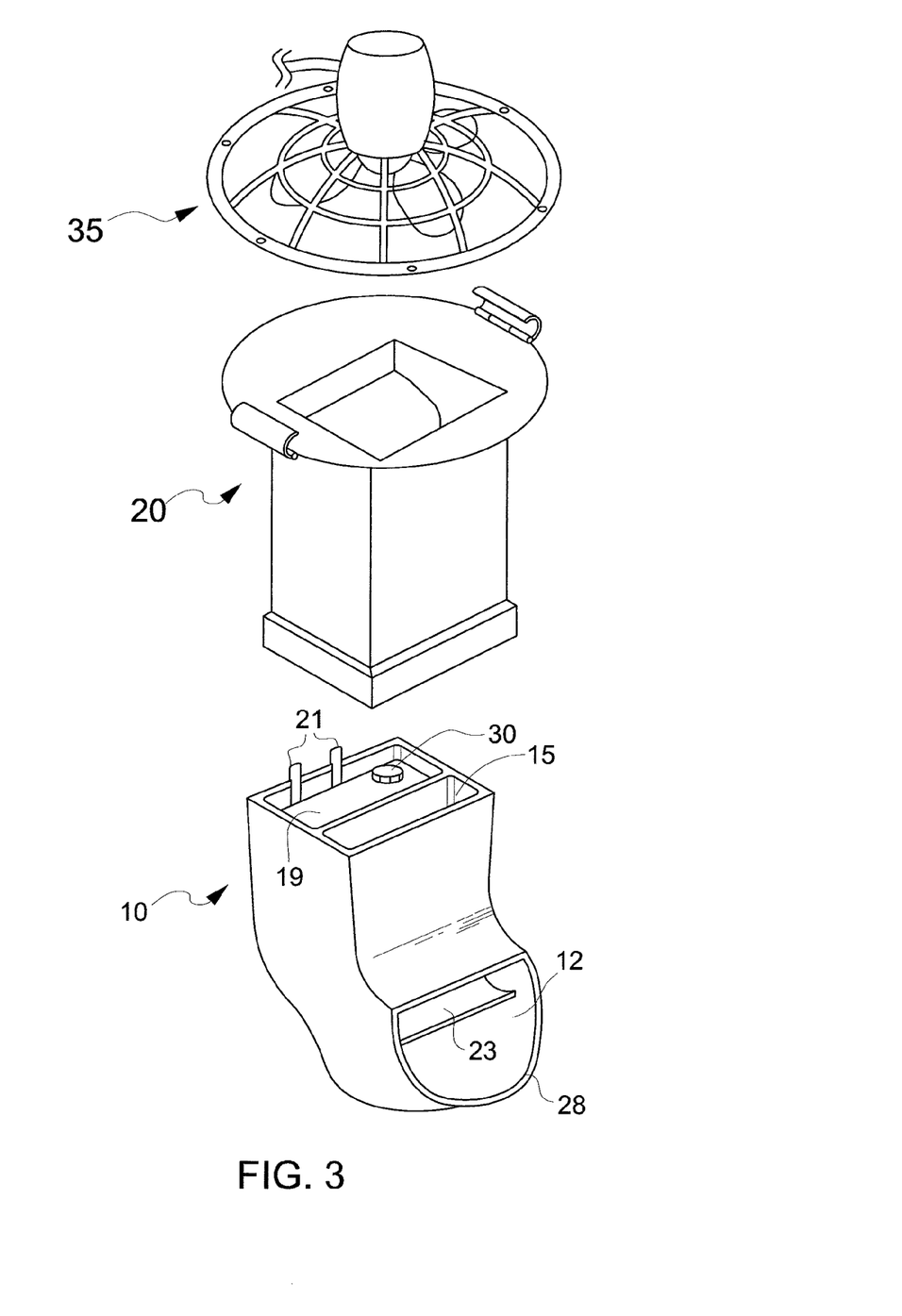
FIG. 3 is a perspective view of the cooling apparatus of FIG. 1.

The cooling apparatus may be a modular device, adapted for connection to different modules. The first housing 10 may be demountably coupled to a second housing module 20, and by way of examples only, such a second housing 20 is shown in FIG. 3. The second housing module 20 may be releasably coupled to a fan 35 for impelling the primary air stream. A battery pack 36 in the second housing module 20 may be provided for supplying power to the ultrasonic atomiser 18 via the electrical contacts 21, and to the fan 35, thus when these three modules 10, 20, 35 are connected a self-contained, portable cooling apparatus is provided.

As best seen in FIGS. 1 and 2, a shared wall 23 may separate the primary and secondary passages 13, 14. The primary passage 13 includes a first portion 24 that extends from the induction nozzle 12 lengthwise adjacent to the secondary passage 14, and which converges toward the induction nozzle 12 to accelerate the primary air flow into the nozzle. The second portion 25 that extends between the first portion 24 and the supply port 15 has a generally constant cross section throughout its length. The first portion 24 may be curved, while the second portion 25 may be linear and disposed adjacent the tank 19. The primary air stream 16 thus initially follows a linear path through the second portion 25, before curving through the first portion 24.

The secondary passage 14 may also be curved in its longitudinal direction, however the secondary passage 14 is not tapered toward its intersection with the induction nozzle 12. The portion of the secondary passage 14 adjacent the induction nozzle 12 has a generally constant cross section throughout its length. The secondary passage 14 preferably has smooth internal surfaces and is substantially unobstructed by internal components or projections from the wall. Without a motor located in the secondary passage 14, or upstream thereof, no sensible heating of the secondary stream occurs in the apparatus. This promotes a substantially laminar flow through the secondary passage 14. A curved centreline 27 of the secondary passage 14 extends longitudinally between the induction nozzle 12 and the atomiser 18. The inlet 17 is disposed generally transversely of this centreline 27 and may comprise a single aperture in the external wall 29. In this first embodiment of the cooler, the secondary passage 14 is bounded on only one side by the shared wall 23, and on the other sides by external walls 29 around the passage 14 are exposed to ambient air.

The induction nozzle 12 may be formed integrally with the walls of the primary and secondary passages 13, 14, and shaped so that the air flows are smoothly transferred from those passages into the nozzle 12. The induction nozzle 12 converges toward its single outlet, inside which the shared wall 23 terminates. The primary and secondary streams are mixed to form a single stream that passes from the outlet, which may have a rim 28 generally disposed in a plane. Thus, while a feature of the invention is the single nozzle 12 producing a single air stream, it will be understood that the inlet 17 and the supply port 15 may comprise multiple adjacent openings in the wall of the housing.

The tank 19 may be slidingly received in a recess in the housing 10 bounded by the shared wall 23 and extensions of the external walls 29, allowing for ready removal when the housings 10, 20 are separated. The tank 19 is also a modular assembly comprising the atomiser 18, and with the electrical contacts 21 for powering the atomiser 18 being fixed to the tank 19. A vented lid 30 is disposed in an upper end of the tank 19. With the tank 19 received in the recess in the housing 10 a lower end 31 of the tank 19 may bound the secondary passage 14, the lower end 31 being disposed above the secondary passage 14 when the apparatus is upright.

The atomiser 18 is fixed to the lower end 31 of the tank 19, so as to be gravity fed. It may comprise a piezoelectric actuation element to cause vibration of an atomising mesh, plate or membrane. The axis of vibration may be generally aligned with the centreline 27 so that the water is generally thrown longitudinally, and downward, in the form of a fine mist. Suitable atomisers produce an average droplet size in the range of about 20 microns, or smaller. Multiple atomisers 18 may be disposed in the secondary passage 14 adjacent the inlet 17.

For use, the modules comprising the cooling apparatus are stacked upon one another, with the first housing 10 lowermost. The tank 19 may be filled with water while in place, or optionally removed, filled then dropped into the top of the first housing 10. The first housing 10 can be held in one hand, while the second housing 20 is stacked on it and coupled thereto. This assembly of housings 10, 20 can then be connected to suitable air supply, or device for impelling an air flow, such as the fan 35 which is advantageously stacked upon the assembly. The modules thus connect to provide a self-contained, portable cooling apparatus which is lightweight, compact and ergonomically arranged for directing a cooling air flow in close proximity to the user.

Figure 4:
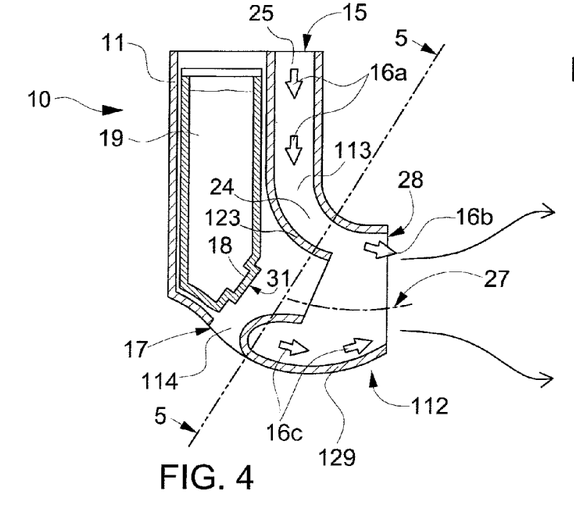
FIG. 4 is a schematic sectional view through a second embodiment of a cooling apparatus of the invention.
Figure 5:
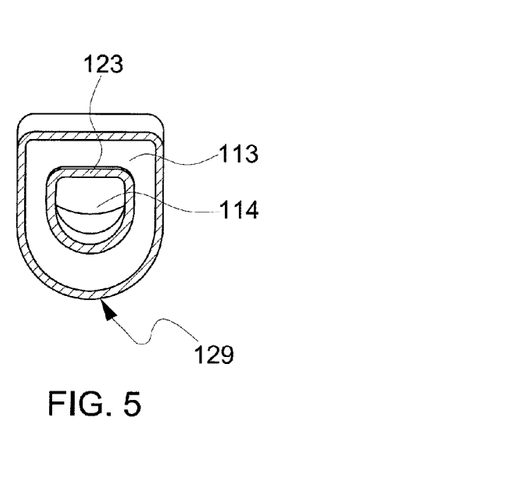
FIG. 5 is a schematic section along plane 5-5 in FIG. 4.

A second embodiment of the cooling apparatus is shown in FIGS. 4 and 5, and although it may be alike externally, it differs from the first embodiment primarily in the shape of the primary and secondary passages 113, 114 and the induction nozzle 112. Whereas the output immediately outside the induction nozzle 112 may include a degree of stratification, due to the limited mixing between the primary and secondary streams that occurs within the nozzle, a greater degree of internal mixing is achieved within this induction nozzle 112. Mixing is promoted in the induction nozzle 112 by surrounding the laminar inner secondary air stream by the semi-turbulent outer primary air stream. The shared wall 123 that separates the primary and secondary passages 113, 114 has a tubular form, inside which the secondary passage 114 extends, while the primary passage 113 is external to the shared wall 123, inside the external wall 129. The primary air stream 16a thus initially follows a linear path through the second portion 25, before it is divided to flow around the shared wall 123. Parts of this divided primary flow are represented by arrows 16b and 16c in FIG. 4. The first flow portion 16b is turned sharply and is the only part of the primary passage 113 that converges toward the induction nozzle 112. The remaining portion of the primary flow 16c passes transverse to the centreline 27 and turns more gradually toward the nozzle 112.

FIG. 4 also schematically illustrates an exemplary arrangement of the second housing module 20, and the fan 35 for impelling the primary air stream. The fan 35 may be an axial flow fan comprising a rotary electric motor 40 that turns blade 41 housed inside a cage 42.

The second housing module 20 may be a moulded polymeric hollow body that tapers from a broad end that attaches to the fan 35 to a narrow end that attaches to the housing 10. Internally, an air passage 43 correspondingly narrows in the axial direction between the broad end and the narrower end, which is located in registration with the supply port 15. A flange 44 at the broad end may be provided with latches 45, connected as by hinges 46 to the flange 44, for engaging the periphery of the cage 42 and thereby latching the fan 35 to the second housing module 20. Latching features, such a integrally moulded live hinged or snap type elements (not shown) may allow the second housing module 20 to readily connected to, and disconnected from, the housing 10. The second housing module 20 also holds a battery pack 36 for supplying power to the fan 35 and ultrasonic atomiser 18. The activation of the atomiser 18 and fan 35 may be controlled by a user-actuable on/off switch 38 and a control circuit 37. The control circuit 37 may also include an air pressure switch 138 disposed in the air passage 43 to provide a signal indicative of operation of the fan 35. The control circuit 37 may thus control the atomiser 18 to operate only when air flow is induced in the secondary passage 114. The air pressure switch 138 may replace the on/off switch 38, and this is particularly suited to embodiments in which the fan 35 is powered by a separate power source, so that the atomiser 18 is actuated by air flow.

Alternatively, a psychrometric microprocessor controller (not shown) may be provided for controlling the atomiser 18 in response to user demand and ambient conditions. The controller, may be responsive to sensors for sensing the wet and dry bulb temperature of the primary and/or secondary air stream at different positions, as well as the fan speed, and the pressure differentials within the apparatus, and control the activation of the atomiser 18 and the fan speed. An advantage of providing a psychrometric microprocessor controller is that the appropriate amount of water mist can be generated according user demand and ambient conditions, so that over-wetting of the air may be avoided.

Figure 6:
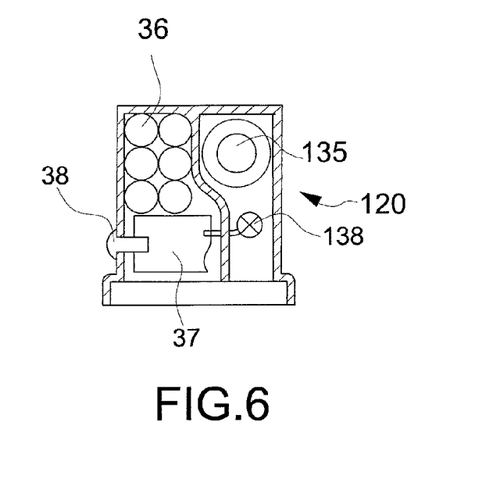
FIG. 6 is a schematic section through a variant of second housing module of the invention.

A variant of the second housing 120 is illustrated in FIG. 6, in which the fan 135 is internally mounted, such that only two modules 10, 120 need be connected to provide a self-contained, portable cooling apparatus.

Figures 7, 8:
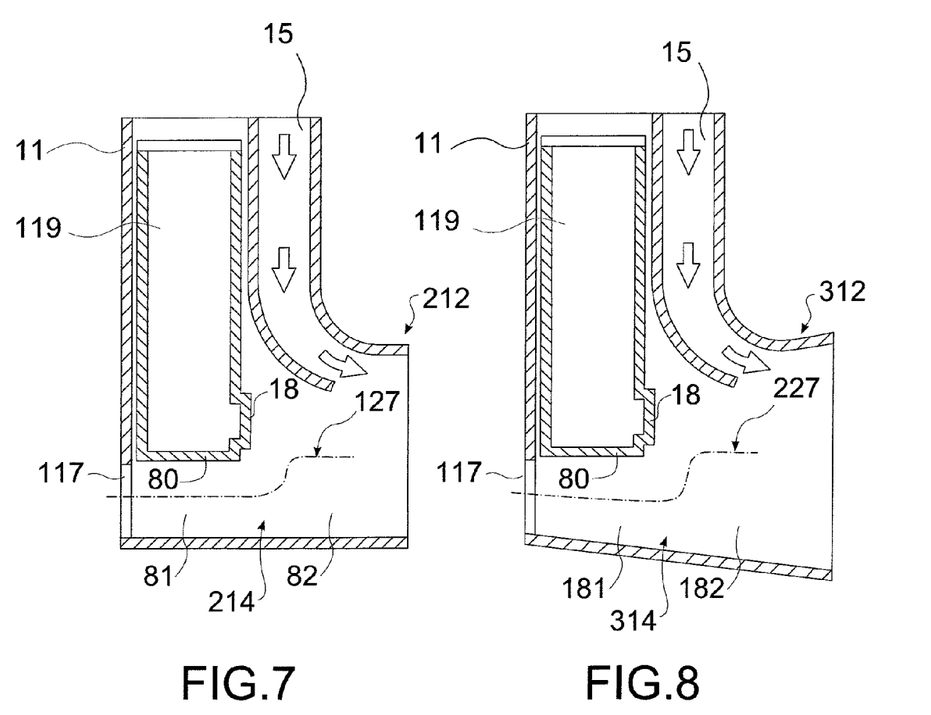
FIGS. 7 and 8 are schematic sectional views of third and fourth embodiments, respectively, of a cooling apparatus of the invention.

FIGS. 7 and 8 illustrate third and fourth embodiment of the cooling apparatus and, in particular, show further preferred alternative forms of the secondary passage 214, 314. In both embodiments, the ambient air inlets 117 and induction nozzles 212, 312 are generally disposed at longitudinally opposing ends of secondary passages 214, 314 that have centrelines 127, 227. The atomiser 18 is disposed on a lower side of the tank 119, above a base 80 of the tank 119, and generally transversely of the centrelines 127, 227. The ambient air inlets 117 are located below the base 80. The secondary passages 214, 314 comprise, extending in their longitudinal direction from the inlet 17, an inlet throat portion 81, 181 below the base 80 that joins an enlarged outlet portion 82, 182 that extends to the induction nozzle 212, 312. In this manner, a dogleg is provided in both secondary passages 214, 314, where the inlet throat portion 81 meets the outlet portion 82, 182.

As shown in FIG. 7, in the secondary passage 214 the outlet portion 82 of the secondary passage 214 adjacent the induction nozzle 212 has a generally constant cross portion throughout its length. With this arrangement, a greater air flowrate through the secondary passage 214, and consequently from the nozzle 212, may be obtained for a given pressure rise across the fan, due to lower pressure losses, by avoiding a sharp change in air flow direction at the inlet 117.

Referring to FIG. 8, the secondary passage 314 diverges in the longitudinal direction between the inlet 117 and the induction nozzle 312 and the induction nozzle 312 is likewise divergent. This divergent arrangement, may also produce a higher volumetric flowrate for a given pressure rise across the fan, because of the reduced flow restriction. This higher volumetric flowrate has been found to be advantageous in reducing condensation formed on the inner walls of the secondary passage.

Figure 9:
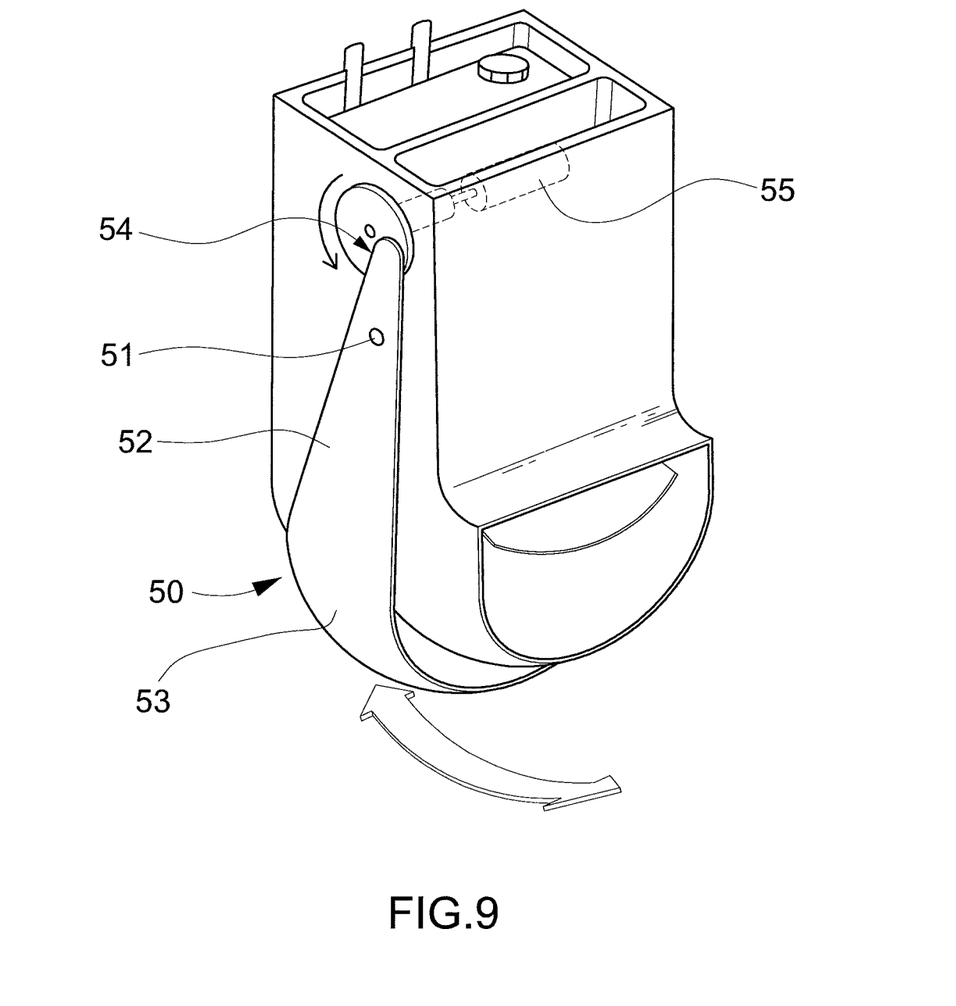
FIG. 9 is a perspective view of a fifth embodiment of a cooling apparatus of the invention.

Referring to FIG. 9, an oscillatory vane 50 may be mounted to the first housing 10 for projecting into the outlet stream from the nozzles 12, 112 so as to sweep the outlet stream back and forth. The vane 50 may include a vane portion 53 with a surface complementary to the external surface of the nozzle, so that it may swing back and forth adjacent the nozzle outlet. Integral with the vane portion 53 and extending from opposite sides are leg portions 52. The vane and leg portions 53, 52 form a generally U-shaped vane 50 that is hung by coaxial pivots 51 fixed to the first housing 10 to define a swing axis. As shown, the swing axis is generally horizontal when the apparatus is upright. The tip of one of the leg portions 52 is fixed via a link (not shown) to an eccentric 54 turned by a rotary motor 55, and in this manner this crank and rocker mechanism, or four bar linkage, may be used to drive the oscillatory movement.

Aspects of the present invention have been described by way of example only and it should be appreciated that modifications and additions may be made thereto without departing from the scope thereof.

The invention claimed is:

1. A portable evaporative cooling apparatus comprising: an induction nozzle; a primary passage for delivering a primary air stream to the induction nozzle; a secondary passage that is unobstructed and extends from an ambient air inlet to the induction nozzle, wherein a secondary air stream is induced through the secondary passage by the primary air stream, and the primary and secondary air streams are ejected from the induction nozzle into ambient air; an atomiser in the secondary passage, proximate the ambient air inlet, for emitting a spray of water into the secondary air stream; electrical contacts connected to the atomiser for supplying electrical power to the atomizer; and a fan for impelling the primary air stream in the primary passage.

2. The apparatus of claim 1 wherein the primary and secondary passages are bounded by impermeable walls of a first housing.

3. The apparatus of claim 1, wherein at least a first portion of the primary passage extends from the induction nozzle, lengthwise, adjacent the secondary passage, and is separated from the secondary passage by a shared wall separating the primary and secondary passages.

4. The apparatus of claim 3, wherein the first portion of the primary passage converges toward the induction nozzle.

5. The apparatus of claim 3, wherein the induction nozzle and the atomiser are disposed proximate longitudinally opposing ends of the secondary passage, and the ambient air inlet is disposed transversely of a centerline of the secondary passage, between the induction nozzle and the atomiser.

6. The apparatus of claim 4, wherein a second portion of the primary passage joins the first portion of the primary passage, the first portion of the primary passage is curved and the second portion of the primary passage is linear, the secondary passage is curved along a longitudinal direction, and the portion of the secondary passage adjacent the induction nozzle has a constant cross section.

7. The apparatus of claim 3, wherein the induction nozzle and the ambient air inlet are disposed proximate longitudinally opposing ends of the secondary passage, and the atomiser is disposed transversely of a centreline of the secondary passage extending between the induction nozzle and the ambient air inlet.

8. The apparatus of claim 7, wherein the secondary passage comprises an inlet throat portion extending in a longitudinal direction from the ambient air inlet, the inlet throat portion joins an enlarged outlet portion that extends to the induction nozzle, and the enlarged outlet portion has a constant cross section.

9. The apparatus of claim 7, wherein
the secondary passage comprises an inlet throat portion extending in the longitudinal direction from the ambient air inlet,
the inlet throat portion joins an enlarged outlet portion that extends to the induction nozzle, and
the enlarged outlet portion diverges in a longitudinal direction toward the induction nozzle.

10. The apparatus of claim 3, wherein
the secondary passage is bounded in part by the shared wall and in part by an external wall, and
the external will has an outer surface which is exposed to the ambient air.

11. The apparatus of claim 3, wherein
the secondary passage is bounded completely by the shared wall,
the shared wall is tubular and disposed within an external wall, and
the primary passage surrounds the shared wall.

12. The apparatus of claim 3 further comprising:
a water tank demountable from the apparatus, wherein the atomiser is mounted at a lower end of the tank, and a vented lid disposed in an upper end of the water tank.

13. The apparatus of claim 2 further comprising a motor-driven oscillatory vane mounted to the first housing and projecting into an outlet stream from the induction nozzle so as to sweep the outlet stream back and forth.

14. The apparatus of claim 2 further comprising a second housing demountably coupled to the first housing, wherein the second housing comprises the fan for impelling the primary air stream and a battery pack for supplying electrical power to the atomiser via the contacts and to the fan.

15. The apparatus of claim 2 further comprising a second housing demountably coupled to the first housing, wherein the second housing comprises latches for securing the fan for impelling the primary air stream.

16. The apparatus of claim 15, wherein the second housing comprises a hollow body that tapers from a broad end to a narrow end which is located in registration with a supply port, the hollow body defines an air passage that narrows in an axial direction between the broad end and the narrow end, and the latches are disposed at the broad end.

17. A cordless personal evaporative cooling apparatus comprising: a first housing assembly having walls defining an induction nozzle, a primary passage for delivering a primary air stream to the induction nozzle, and a secondary passage extending from an ambient air inlet to the induction nozzle, wherein a secondary air stream is induced through the secondary passage by the primary air stream, and mixed primary and secondary air streams are ejected from the induction nozzle into ambient air; a water tank demountable from the first housing assembly; an ultrasonic atomiser mounted at a lower end of the water tank and disposed in the secondary passage, proximate the ambient air inlet, for emitting a spray of water into the secondary air stream, and a second housing assembly demountably coupled to the first housing assembly, wherein the second housing assembly comprises a fan for impelling the primary air stream and a battery pack for supplying power to the ultrasonic atomiser and to the fan.

18. The apparatus of claim 17, wherein
the walls are a polymeric material and are substantially impermeable, and
at least a first portion of the primary passage extends from the induction nozzle, lengthwise, adjacent the secondary passage, and is separated from the secondary passage by a shared wall separating the primary and secondary passages.

19. The apparatus of claim 18, wherein the first portion of the primary passage converges toward the induction nozzle.

20. The apparatus of claim 18, wherein the induction nozzle and the ultrasonic atomiser are disposed proximate longitudinally opposing ends of the secondary passage, and the ambient air inlet is disposed transversely of a centreline of the secondary passage, between the induction nozzle and the ultrasonic atomiser.

21. The apparatus of claim 20, wherein a second portion of the primary passage joins the first portion of the primary passage, the first portion of the primary passage is curved and the second portion of the primary passage is linear and extends adjacent the water tank, the secondary passage is curved in a longitudinal direction, and the portion of the secondary passage adjacent the induction nozzle has a constant cross section.

22. The apparatus of claim 17, wherein the induction nozzle and the ambient air inlet are disposed proximate longitudinally opposing ends of the secondary passage, and the ultrasonic atomiser is disposed transversely of a centreline of the secondary passage extending between the induction nozzle and the ambient air inlet.

23. The apparatus of claim 22, wherein the secondary passage comprises an inlet throat portion extending in a longitudinal direction from the ambient air inlet, the inlet throat portion joins an enlarged outlet portion that extends to the induction nozzle, and the enlarged outlet portion has a constant cross.

24. The apparatus of claim 22, wherein the secondary passage comprises an inlet throat portion extending in a longitudinal direction from the ambient air inlet, the inlet throat portion joins an enlarged outlet portion that extends to the induction nozzle, and the enlarged outlet portion diverges in the longitudinal direction toward the induction nozzle.

25. The apparatus of claim 18, wherein the secondary passage is bounded in part by the shared wall and in part by an external wall, wherein the external wall has an outer surface which is exposed to the ambient air.

26. The apparatus of claim 18, wherein the secondary passage is bounded completely by the shared wall, and the shared wall is tubular and disposed within an external wall, such that the primary passage surrounds the shared wall.

27. The apparatus of claim 18 further comprising a motor-driven oscillatory vane mounted to the first housing assembly and projecting into an outlet stream from the induction nozzle so as to sweep the outlet stream back and forth.

* * * * *